United States Patent
Chu et al.

(10) Patent No.: US 8,432,847 B2
(45) Date of Patent: Apr. 30, 2013

(54) VTS FRAME FORMAT

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 359 days.

(21) Appl. No.: 12/493,021

(22) Filed: Jun. 26, 2009

(65) Prior Publication Data

US 2010/0165906 A1      Jul. 1, 2010

Related U.S. Application Data

(60) Provisional application No. 61/142,156, filed on Dec. 31, 2008.

(51) Int. Cl.
*H04H 20/71*      (2008.01)

(52) U.S. Cl.
USPC .......................................................... 370/312

(58) Field of Classification Search .................. 370/312, 370/331, 338; 375/316
See application file for complete search history.

(56) References Cited

U.S. PATENT DOCUMENTS

| | | | |
|---|---|---|---|
| 2008/0192709 A1* | 8/2008 | Mikami et al. ................. | 370/338 |
| 2008/0219381 A1* | 9/2008 | Karaoguz et al. .............. | 375/316 |
| 2010/0061342 A1* | 3/2010 | Frederiks et al. .............. | 370/331 |

* cited by examiner

*Primary Examiner* — Albert T Chou
(74) *Attorney, Agent, or Firm* — Seed IP Law Group PLLC

(57) ABSTRACT

Methods and apparatus for transmitting a video frame in wireless local area network communications are proposed. In one aspect, a method generates and transmits an IEEE 802.11 media access control (MAC) frame containing a video transport stream (VTS) frame. The VTS frame includes a video frame and a VTS control header that includes control information with respect to the video frame.

14 Claims, 9 Drawing Sheets

VTS FRAME FORMAT

CROSS-REFERENCE TO RELATED APPLICATION

This application claims the benefit under 35 U.S.C. §119(e) of U.S. Provisional Patent Application Ser. No. 61/142,156, filed Dec. 31, 2008, entitled "VTS Frame Format", which is incorporated herein by reference in its entirety.

BACKGROUND

1. Technical Field

This disclosure generally relates to the field of transmission of audio and video streams in wireless local area network (WLAN) communications and, more particularly, to quality of service for multicast and broadcast of video streams in WLAN communications.

2. Description of the Related Art

In recent years, wireless computer networks such as WLANs have been widely deployed in places ranging from homes and businesses to hotels, airports, schools, etc. Compared to wire networks, a WLAN provides users mobile connectivity and are typically more scalable and require lower cost in network construction. With the popularity of multimedia applications like streaming multimedia and voice over IP on the rise, it is important to ensure quality of service in the delivery of time-sensitive multimedia content in a WLAN.

The IEEE 802.11aa video transmission enhancement task group has identified a number of issues that need to be addressed in the video transport stream (VTS) project authorization request (PAR) for the quality of service for video transport streams. For instance, graceful degradation of audio video streams needs to be provided when there is insufficient channel capacity without the need for deep inspection of the frame. As another example, intra-access category prioritization of transport streams needs to be provided without the need for deep inspection of the frame. Additionally, increased robustness in overlapping basic service set (OBSS) environments is needed without a centralized management entity, and improved link reliability and low jitter characteristics are needed for multicast and broadcast audio video streams. Further, interworking with relevant IEEE 802.1 audio video bridging (AVB) mechanisms such as IEEE 802.1Qat, 802.1Qav, and 802.1AS is also needed.

BRIEF SUMMARY

A method of transmitting a video frame in wireless local area network communications may be summarized as including generating an IEEE 802.11 media access control (MAC) frame containing a VTS frame, the VTS frame having the video frame and a VTS control header that includes control information with respect to the video frame; and transmitting the MAC frame. The control information may include information related to at least one of an intra-access category priority and a frame discard priority with respect to the video frame. The control information may further include IEEE 802.1 AVB related information. Generating the IEEE 802.11 MAC frame may include generating the MAC frame to include a frame control header, a frame body field, and the VTS frame in the MAC frame; and setting each of a type field and a subtype field in the frame control header of the MAC frame to a respective value to indicate a presence of the VTS frame in the MAC frame. The value of the type field may be set to 11 and the value of the subtype field may be set to one of 1000, 1001, 1010, 1011, 1100, 1110, and 1111.

The MAC frame may include a frame control header, a frame body field, and the VTS frame in the MAC frame with or without the VTS control header not encapsulated in the frame body field of the MAC frame. When the VTS control header and the video frame are encapsulated in the frame body field of the MAC frame, an ethertype field in the MAC frame may be set, such as to a value of 89-0d, to distinguish the encapsulated VTS frame from other frames encapsulated in the frame body field of the MAC frame. Alternatively or additionally, an encapsulated type field in the MAC frame may be set to indicate encapsulation of the VTS frame in the frame body field of the MAC frame.

A circuit in a wireless communication device may be characterized as including a communication logic that is configured to generate an IEEE 802.11 MAC frame that contains a VTS frame having a video frame and a VTS control header in the MAC frame. The VTS control header may contain control information related to at least one of an intra-access category priority and a frame discard priority with respect to the video frame. The VTS control header may further include IEEE 802.1 AVB related information. The communication logic may be further configured to generate the MAC frame having a frame control header and the VTS frame, and further configured to set a type field and a subtype field in the frame control header of the MAC frame to indicate a presence of the VTS frame in the MAC frame. The MAC frame may include a frame control header, and a type field and a subtype field in the frame control header of the MAC frame may each be set to a respective value to indicate a presence of the VTS frame in the MAC frame. The type field may be set to 11, and the subtype field may be set to one of 1000, 1001, 1010, 1011, 1100, 1110, and 1111.

The VTS control header may or may not be encapsulated in a frame body field of the MAC frame. When the VTS control header is encapsulated in the frame body field of the MAC frame, an ethertype field in the MAC frame may be set to distinguish the encapsulated VTS frame from other frames encapsulated in the frame body field of the MAC frame. The ethertype field may be set to 89-0d. Alternatively or additionally, an encapsulated type field in the MAC frame may be to indicate encapsulation of the VTS frame in the frame body field of the MAC frame.

DETAILED DESCRIPTION

As used herein, the term "broadcast" generally refers to transmission of wireless signals to one or more unspecified devices capable of receiving wireless signals. The term "broadcast" may further refer to wireless transmission of data, audio, and/or video packets from an access point of a basic service set to all stations of the basic service set in the context of a local area network such as a WLAN.

As used herein, the term "multicast" generally refers to transmission of wireless signals to a plurality of specified destinations or devices capable of receiving wireless signals. The term "multicast" may further refer to wireless transmission of data, audio, and/or video packets from an access point of a basic service set to a subset of the stations of the basic service set in the context of a local area network such as a WLAN.

As used herein, the term "unicast" generally refers to transmission of wireless signals to a specified destination or device capable of receiving wireless signals. The term "unicast" may further refer to wireless transmission of data, audio, and/or video packets from an access point of a basic service set to one of the stations of the basic service set in the context of a local area network such as a WLAN.

As used herein, the term "transmission" generally refers to transmission of wireless signals to any number of devices capable of receiving wireless signals via broadcast, multicast or unicast. The term "transmission" may further refer to wireless transmission of data, audio, and/or video packets from an access point of a basic service set to any number of the stations and access points in a basic service set and any overlapping basic service set in the context of a local area network such as a WLAN.

Figure 1A:
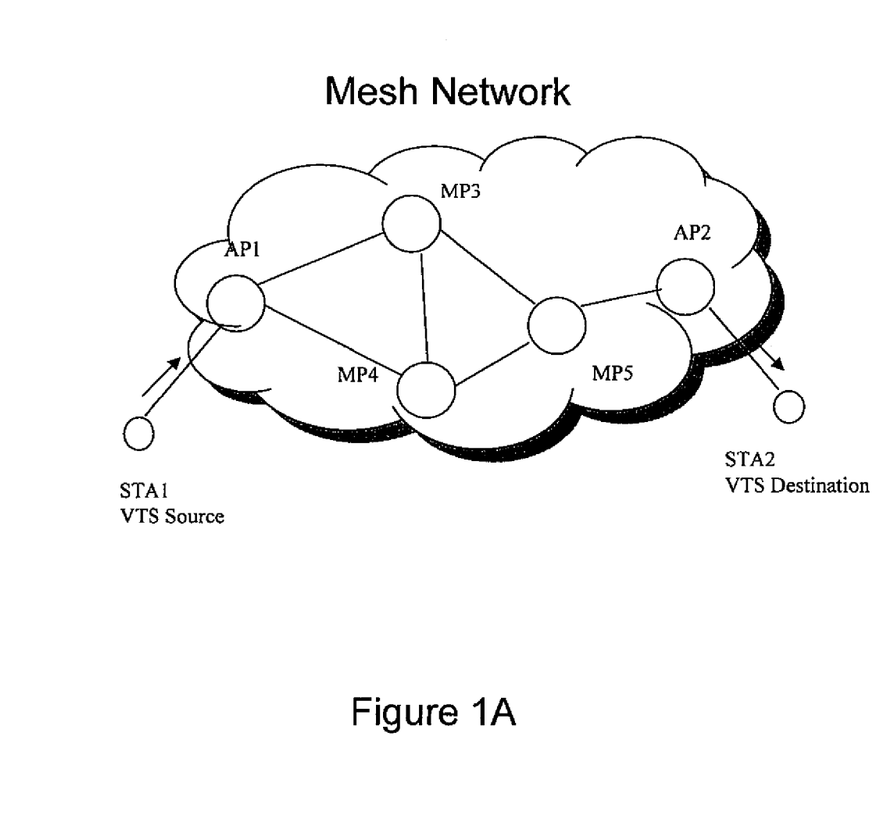
FIG. 1 is a simplified diagram illustrating transport of VTS frames from a VTS source to a VTS destination.
Figure 1B:
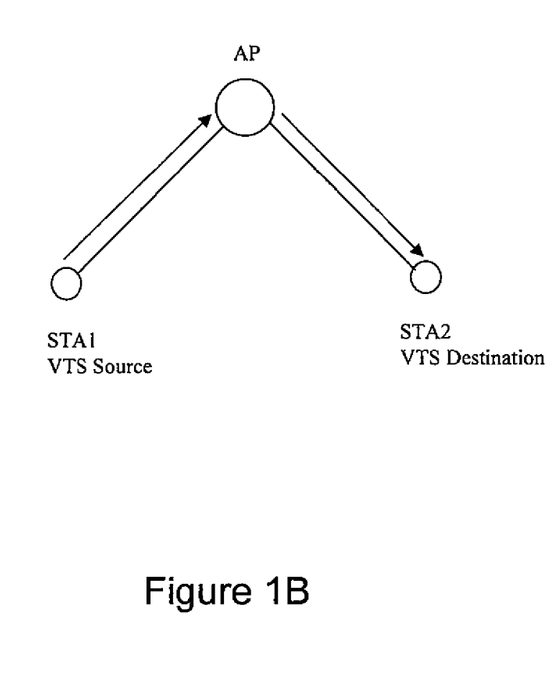

FIG. 1 illustrates the transport of VTS frames from a VTS source to a VTS destination. As shown in FIG. 1, VTS frames are to be sent from station STA1, the source of the VTS frames, to station STA2, the destination of the VTS frames. The path through which the stream of VTS frames needs to traverse may range from a single access point AP, as shown in FIG. 1B, to a network that may be a mesh network according to the IEEE 802.11s standards, as shown in FIG. 1A. The mesh network of FIG. 1A includes a number of access points AP1, AP2 and mesh points MP3, MP4 and MP5. In the example shown in FIG. 1A, the VTS frames will pass through four or five of the access points and mesh points in the mesh network. As the VTS frames are forwarded by one or more access points and mesh points between the source and the destination, issues related to quality of service may arise when there is no VTS control information carried in the VTS frames. For example, without control information, an access point forwarding the VTS frames would not know how to discard any of the VTS frames in a congested channel situation. Without performing a deep inspection of the frame, which would require time and consequently result in delay, an access point forwarding the VTS frames would not know the priority between different VTS frames in the same access category. To address these issues, video frames at the MAC layer should carry video-related control information.

Figure 2:
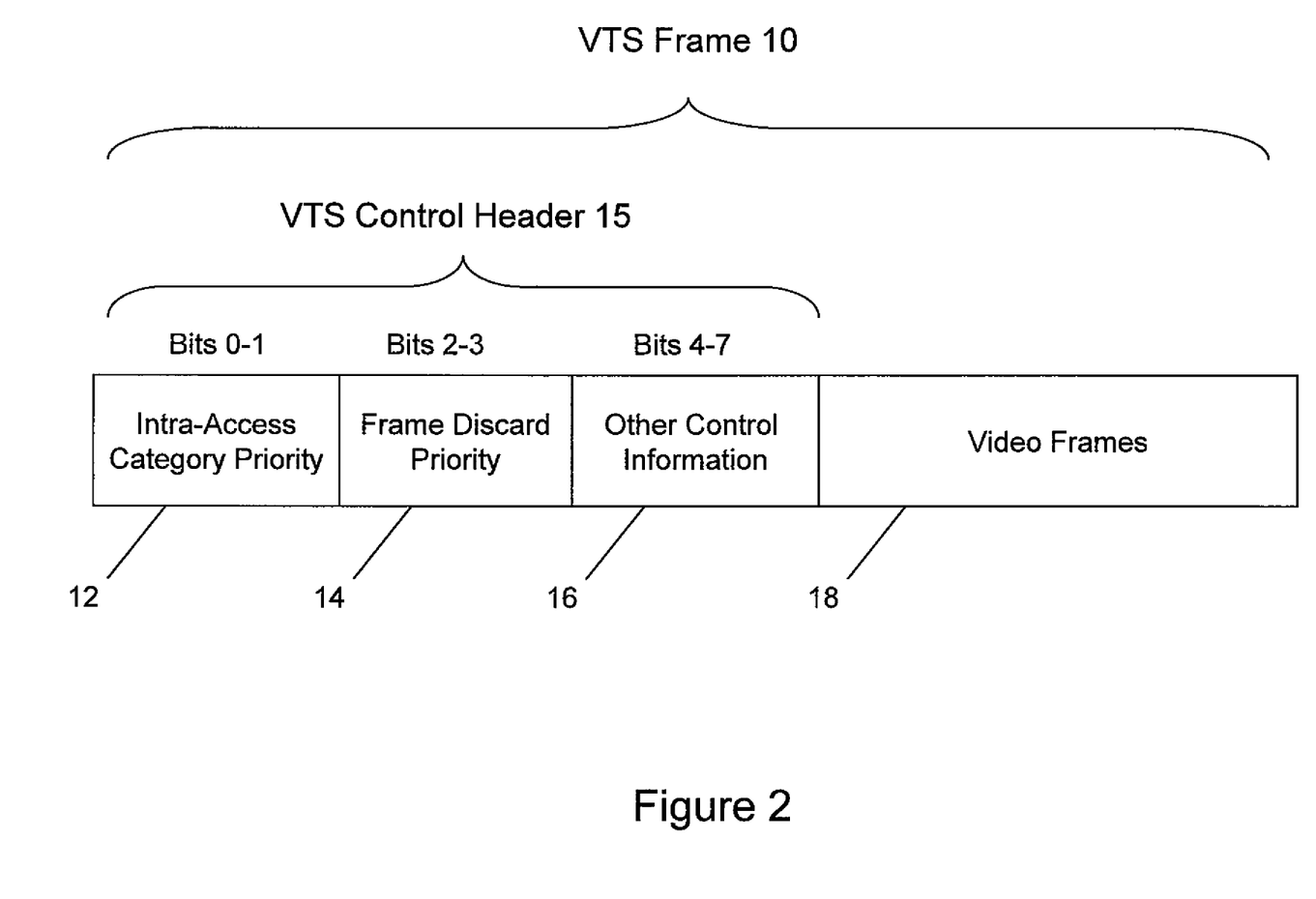
FIG. 2 is a simplified diagram illustration a VTS frame according to one embodiment.

FIG. 2 illustrates a VTS frame 10 according to one embodiment. The VTS frame 10 includes a VTS control header 15 and one or more associated video frames 18. The VTS control header 15 includes one or more fields, such as fields 12, 14 and 16, that contain information on at least one of the intra-access category priority, frame discard priority, and other control information with respect to the video frames 18. As shown in FIG. 2, in one embodiment, the field 12 of the VTS control header 15 contains information on intra-access category priority with respect to the video frames 18, the field 14 of the VTS control header 10 contains information on frame discard priority with respect to the video frames 18, and the field 16 of the VTS control header 15 contains other control information with respect to the video frames 18. In one embodiment, the control information includes IEEE 802.1 AVB related information with respect to the video frames 18. In another embodiment, in an eight-bit VTS control header as shown in FIG. 2, bits 0-1 of the VTS control header are used to define the intra-access category priority, bits 2-3 are used to define the frame discard priority, and bits 4-7 are reserved or used to define other control information such as IEEE 802.1 AVB related information. Alternatively, if more than eight bits are used for the VTS control header, bits 0-1 are used to define the intra-access category priority, bits 2-3 are used to define the frame discard priority, while the bits from bit 4 and beyond are reserved to define other control information. It should be noted that FIG. 2 is a conceptual depiction of the VTS frame 10 and that, although the VTS control header 15 and the video frames 18 are shown to be contiguous to each other, such is not necessarily the case when the VTS control header 15 and the video frames 18 are included in a MAC frame.

Figure 3:
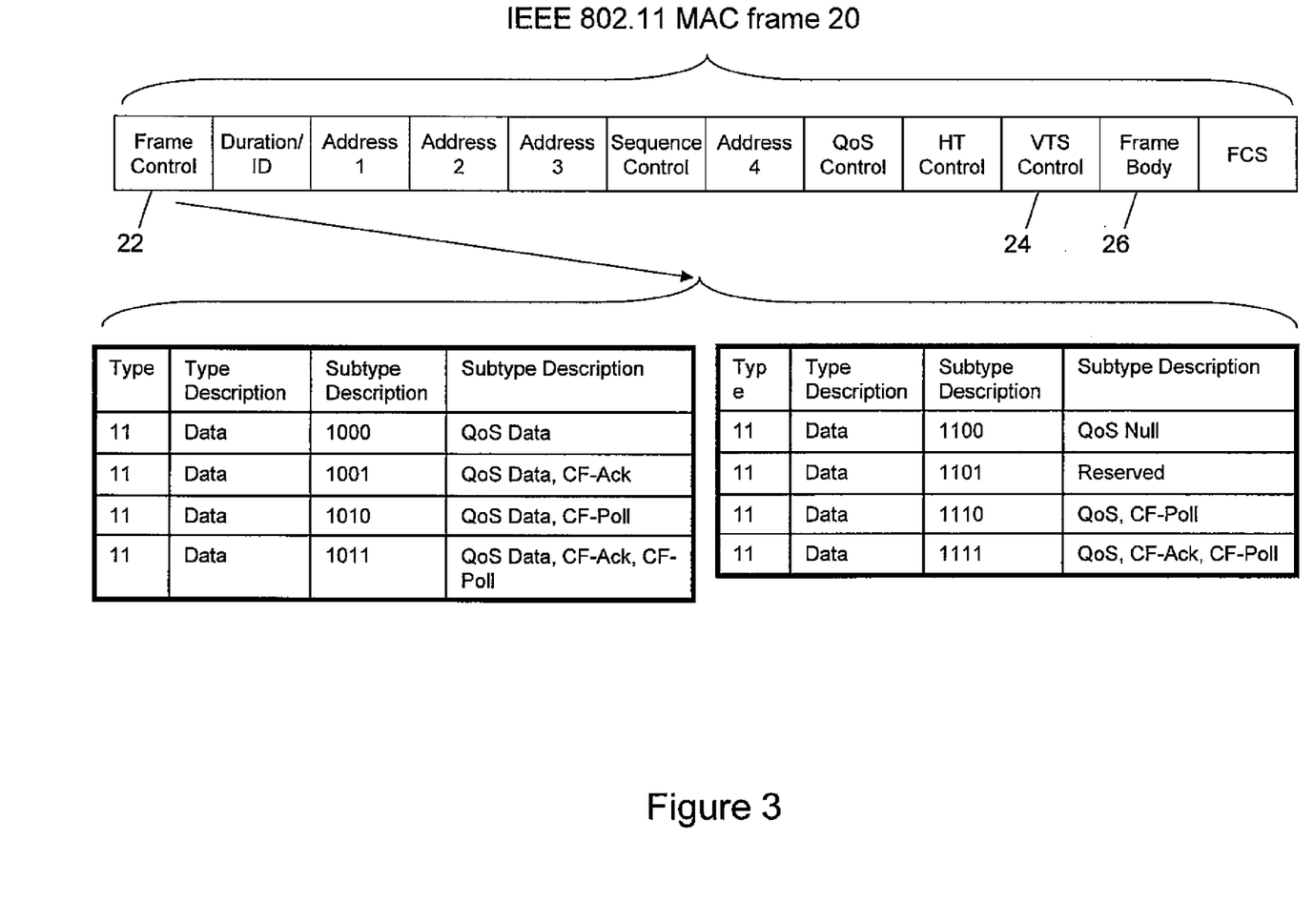
FIG. 3 is a simplified diagram illustrating a method to carry VTS control information in a MAC frame according to one embodiment.

FIG. 3 illustrates a method to carry VTS control information in an IEEE 802.11 MAC frame 20 according to one embodiment. The MAC frame 20 has a number of fields including a frame control field 22 and a frame body field 26, among others, in accordance with the IEEE 802.11 standards. A VTS control field 24 containing a VTS control header, such as the VTS control header 15 of FIG. 2, is added to the MAC frame 20 as shown in FIG. 3. Video frames, such as the video frames 18 of FIG. 2, are encapsulated in the frame body field 26 of the MAC frame 20. The presence of the VTS control field 24 is indicated by setting the values of the type field and the subtype field of the frame control header in the frame control field 22 of the MAC frame 20. For example, in one embodiment, the value of the type field is set to 11 and the value of the subtype field is set to a value between 1000 and 1111 except 1101 to indicate the presence of the VTS control header in the VTS control field 24 and the associated video frames.

As known in the art, a value of 00 in the type field indicates a management frame, a value of 01 in the type field indicates a control frame, and a value of 10 in the type field indicates a data frame. The value of 11 has been reserved or is otherwise not used. Thus, in one embodiment, the value of 11 in the type field is used to indicate a VTS frame. On the other hand, the subtype field may be used to differentiate among the data and video frames so that, for example, it can be determined how the frames are to be sent under different channel conditions. As shown in FIG. 3, each of the proposed subtype values of 1000, 1001, 1010, 1011, 1100, 1110 and 1111 describes the associated VTS frame. For example, a subtype value of 1001 indicates the associated frame being a data frame requiring quality of service, and should be sent under contention-free condition with an acknowledgement from the receiver.

One advantage of the proposed method of carrying VTS control information in a MAC frame as shown in FIG. 3 is that it is relatively simple for a network device, such as an access point, to decode the frame to identify it as a VTS frame. This avoids the need for a deep inspection. Another advantage is that the resulting length of the frame is minimally increased. However, one disadvantage of the proposed method as shown in FIG. 3 is that the type and subtype values for the frame control header are consumed.

Figure 4:
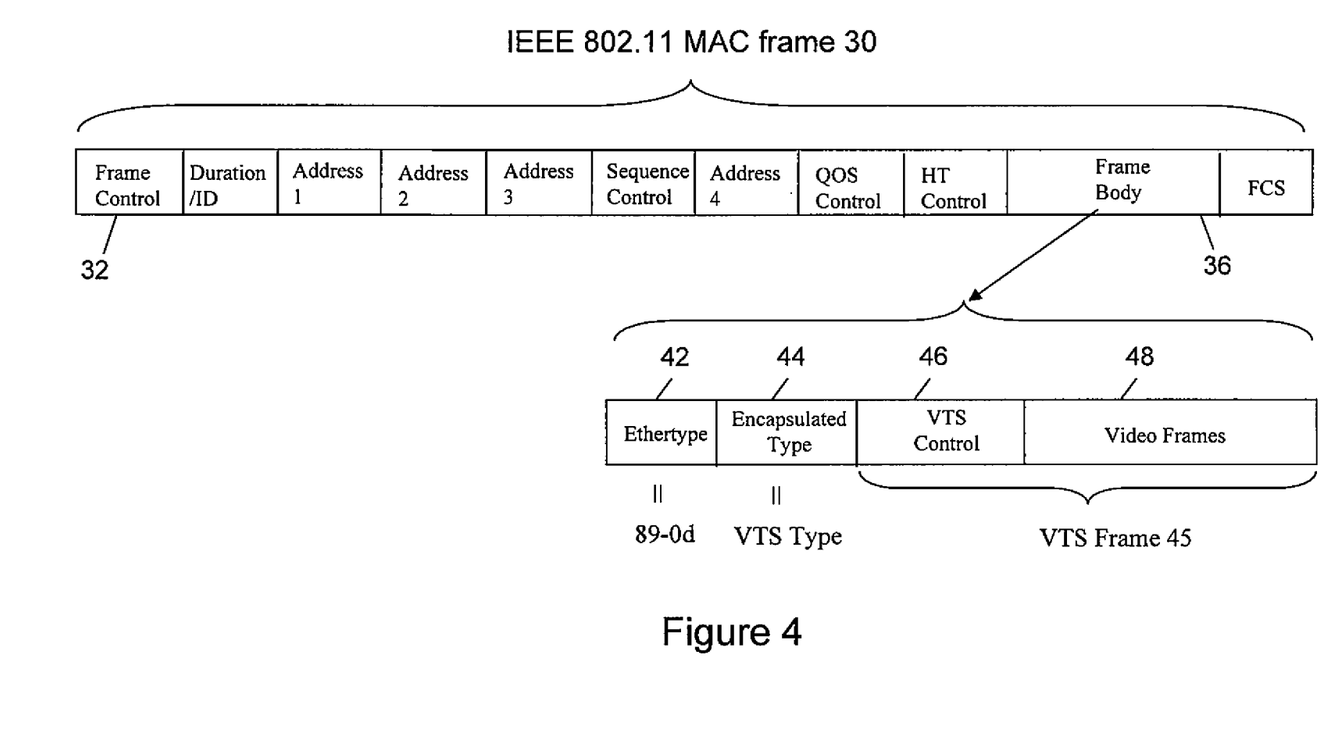
FIG. 4 is a simplified diagram illustrating a method to carry VTS control information in a MAC frame according to another embodiment.

FIG. 4 illustrates an alternative method to carry VTS control information in an IEEE 802.11 MAC frame 30 according to another embodiment. The MAC frame 30 has a number of fields including a frame control field 32 and a frame body field 36, among others, in accordance with the IEEE 802.11 standards. A VTS frame 45 is encapsulated in the frame body field 36 of the MAC frame 30. The VTS frame 45 includes a VTS control header 46 and one or more video frames 48. The MAC frame 30 also includes a logical link control (LLC)/sub-network access protocol (SNAP) ethertype field 42 and an encapsulated type field 44. To indicate the presence of the VTS frame 45 in the frame body field 36, the ethertype field 42 is set to a distinct value to distinguish the VTS frame 45 from other types of frames encapsulated in the MAC frame 30. In one embodiment, the ethertype field 42 is set to the value of 89-0d. In another embodiment, the encapsulated type field 44, which may be sixteen bits long, is set to a value to indicate the encapsulated frame being of the VTS type. In yet another embodiment, both of the ethertype field 42 and the encapsulated type field 44 are each set to a selected value as described above when the VTS frame 45 is encapsulated in the frame body field 36 of the MAC frame 30.

One advantage of the proposed method of carrying VTS control information in a MAC frame as shown in FIG. 4 is that the tunneling method chosen by the IEEE 802.11r, 802.11v, and 802.11z amendments may be leveraged. However, one disadvantage of the proposed method as shown in FIG. 4 is that more fields need to be parsed and that the length of the frame becomes longer.

Figure 5:
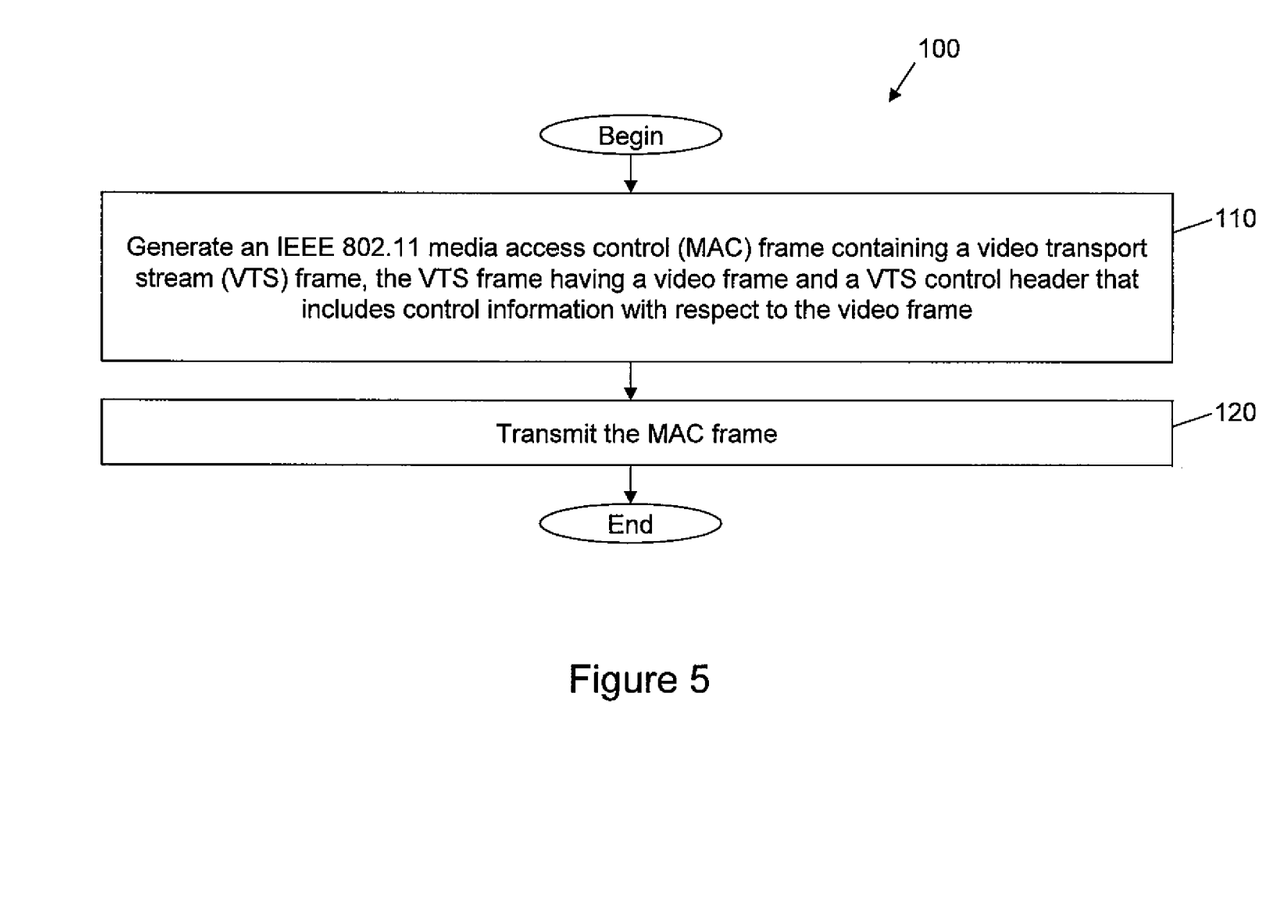
FIG. 5 is a flow chart illustrating a process of transmitting a video frame in WLAN communications according to one embodiment.

FIG. 5 illustrates a process 100 of transmitting a video frame in WLAN communications according to one embodiment. At 110, an IEEE 802.11 MAC frame containing a VTS frame is generated. The VTS frame includes the video frame and a VTS control header that includes control information with respect to the video frame. At 120, the MAC frame is transmitted. In one embodiment, the control information includes information related to at least one of an intra-access category priority and a frame discard priority with respect to the video frame. In another embodiment, the control information further includes IEEE 802.1 audio video bridging (AVB) related information. In one embodiment, the MAC frame includes a frame control header, a frame body field, and the VTS frame. Additionally, a type field and a subtype field in the frame control header of the MAC frame are each set to a respective value to indicate a presence of the VTS frame in the MAC frame. In one embodiment, the type field is set to a value of 11 and the subtype field is set to one of the following values: 1000, 1001, 1010, 1011, 1100, 1110 and 1111. The VTS control header of the VTS frame is not encapsulated in the frame body field of the MAC frame.

Figure 6:
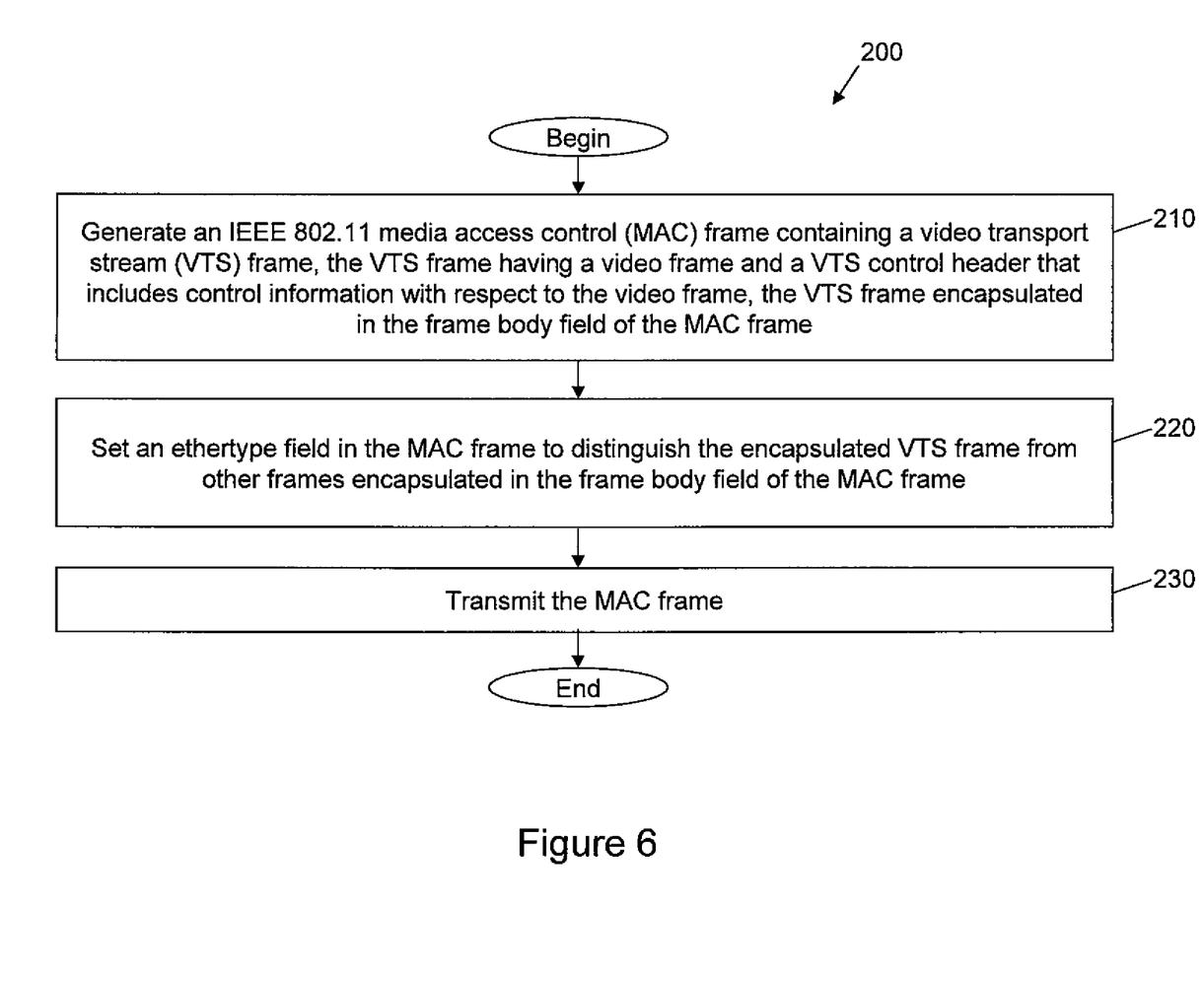
FIG. 6 is a flow chart illustrating a process of transmitting a video frame in WLAN communications according to another embodiment.

FIG. 6 illustrates a process 200 of transmitting a video frame in WLAN communications according to another embodiment. At 210, an IEEE 802.11 MAC frame containing a VTS frame is generated. The VTS frame includes the video frame and a VTS control header that includes control information with respect to the video frame. The VTS frame is encapsulated in the frame body field of the MAC frame. At 220, an ethertype field in the MAC frame is set to a value to distinguish the encapsulated VTS frame from other frames encapsulated in the frame body field of the MAC frame. At 230, the MAC frame is transmitted. In one embodiment, the value of the ethertype field is set to 89-0d.

Figure 7:
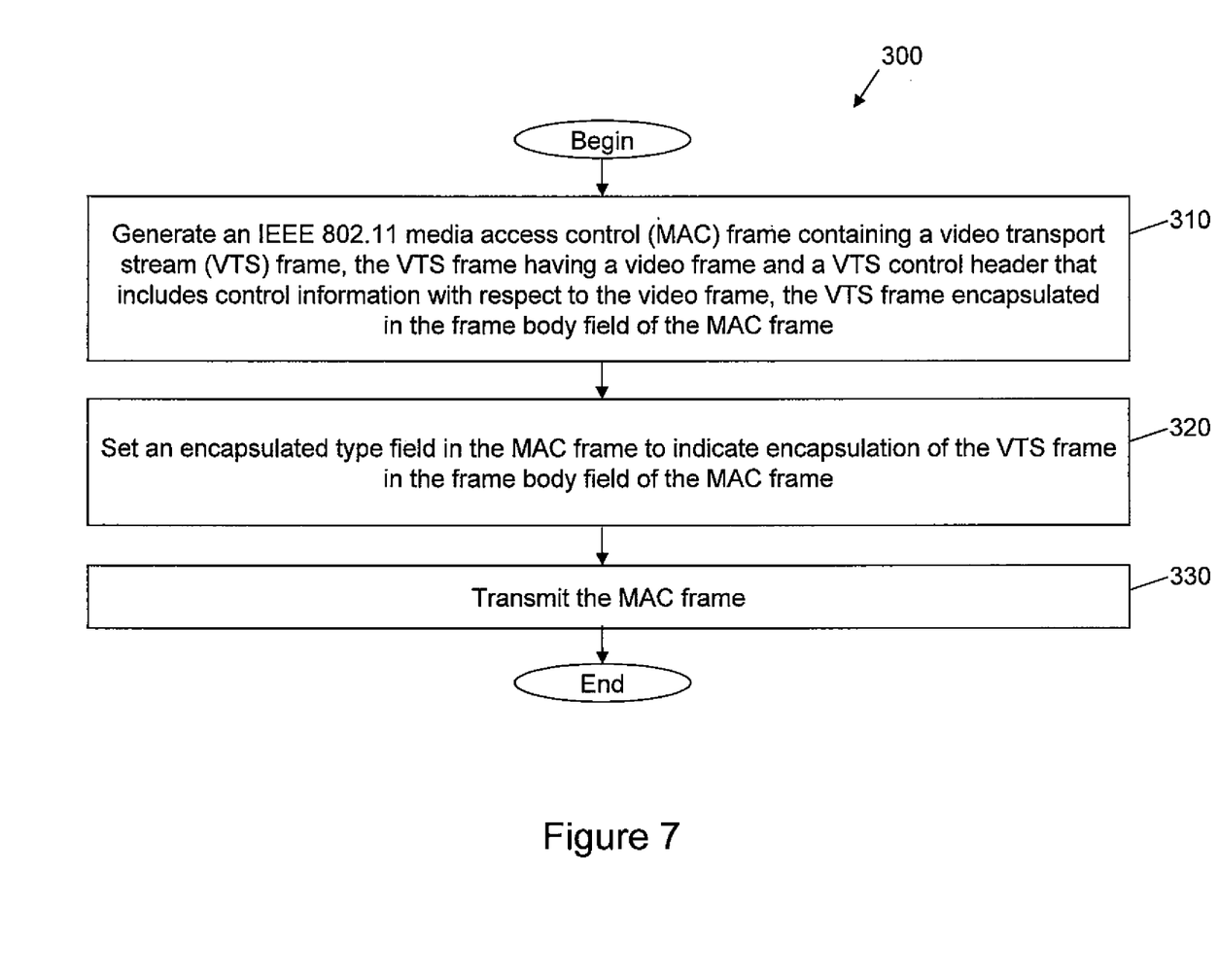
FIG. 7 is a flow chart illustrating a process of transmitting a video frame in WLAN communications according to still another embodiment.

FIG. 7 illustrates a process 300 of transmitting a video frame in WLAN communications according to still another embodiment. At 310, an IEEE 802.11 MAC frame containing a VTS frame is generated. The VTS frame includes the video frame and a VTS control header that includes control information with respect to the video frame. The VTS frame is encapsulated in the frame body field of the MAC frame. At 320, an encapsulated type field in the MAC frame is set to a value to indicate encapsulation of the VTS frame in the frame body field of the MAC frame. At 330, the MAC frame is transmitted.

Figure 8:
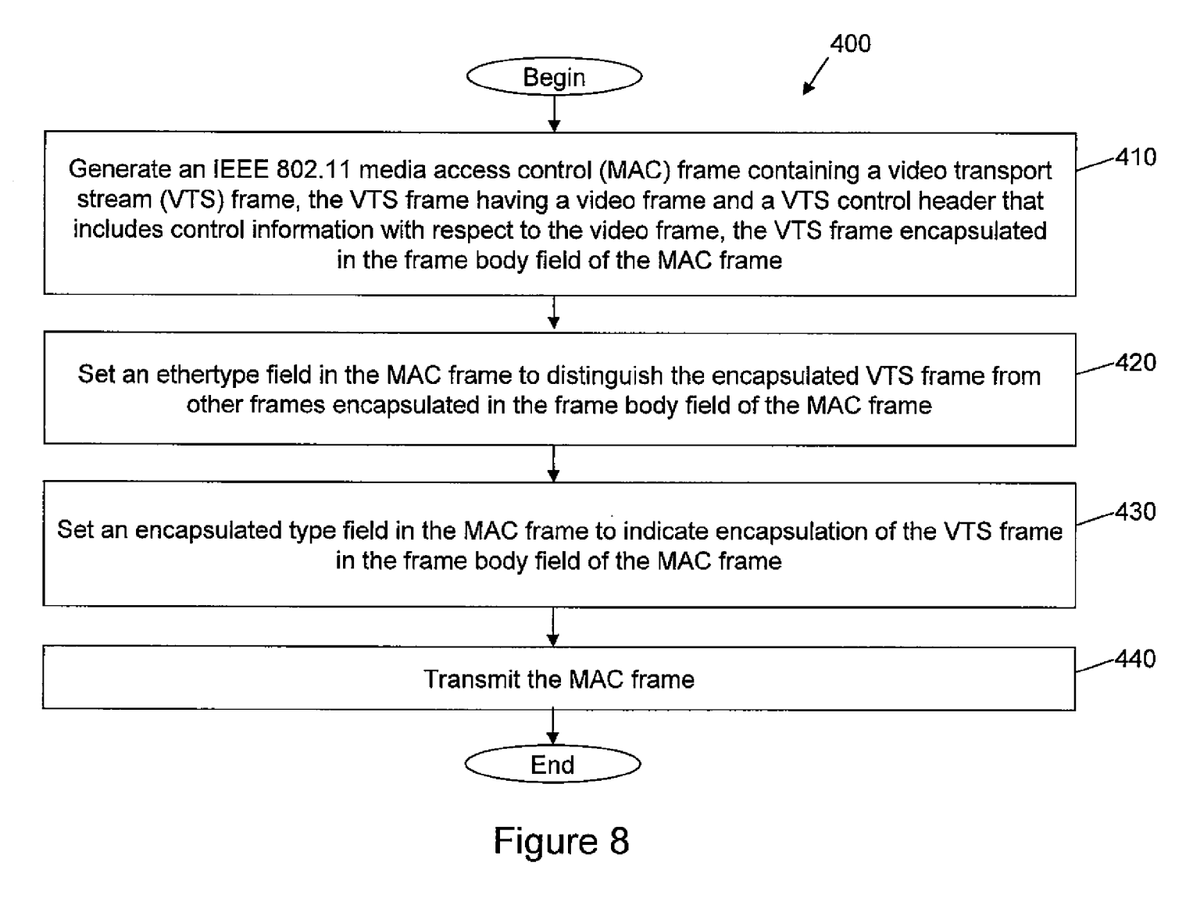
FIG. 8 is a flow chart illustrating a process of transmitting a video frame in WLAN communications according to yet another embodiment.

FIG. 8 illustrates a process 400 of transmitting a video frame in WLAN communications according to yet another embodiment. At 410, an IEEE 802.11 MAC frame containing a VTS frame is generated. The VTS frame includes the video frame and a VTS control header that includes control information with respect to the video frame. The VTS frame is encapsulated in the frame body field of the MAC frame. At 420, an ethertype field in the MAC frame is set to a value to distinguish the encapsulated VTS frame from other frames encapsulated in the frame body field of the MAC frame. At 430, an encapsulated type field in the MAC frame is set to a value to indicate encapsulation of the VTS frame in the frame body field of the MAC frame. At 440, the MAC frame is transmitted. In one embodiment, the value of the ethertype field is set to 89-0d.

Figure 9:
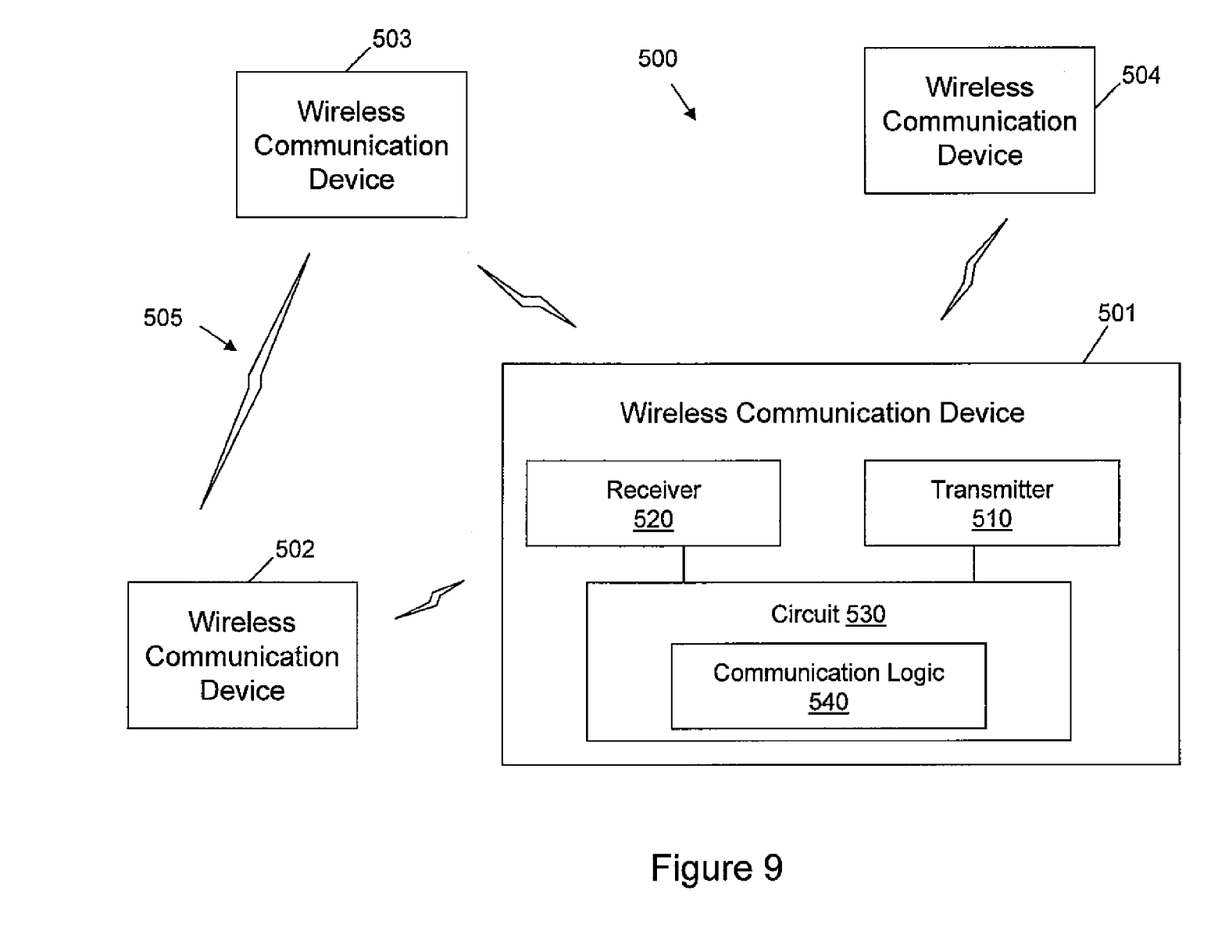
FIG. 9 is a simplified block diagram of a wireless communication device in a WLAN communication system according to one embodiment.

FIG. 9 illustrates a wireless communication device 501 in a WLAN communication system 500 according to one embodiment. The wireless communication device 501 includes a transmitter 510, a receiver 520, and a circuit 530. The control circuit 530 includes communication logic 540. The communication logic 540 is configured to generate an IEEE 802.11 MAC frame that contains a VTS frame, such as the VTS frame 10 of FIG. 2, for example. The VTS frame includes one or more video frames and a VTS control header having control information with respect to the one or more video frames. In one embodiment, the circuit 530 is coupled to the transmitter 510 and configured to cause the transmitter 510 to transmit the IEEE 802.11 MAC frame that contains the VTS frame.

In one embodiment, the VTS control header generated by the communication logic 540 includes information related to one or more of an intra-access category priority, frame discard priority, a source address, a destination address, priority, routing information, and service class with respect to one or more video frames associated with the VTS control header. In one embodiment, the VTS control header includes IEEE 802.1 AVB related information. In another embodiment, the MAC frame generated by the communication logic 540 includes a frame control header and the VTS frame, and the frame control header includes a type field and a subtype field. To indicate the presence of the VTS frame in the MAC frame, the type field is set to a value of 11 and the subtype field is set to a value of one of 1000, 1001, 1010, 1011, 1100, 1110 and 1111.

In one embodiment, the MAC frame generated by the communication logic 540 includes a frame body field. The video frame of the VTS frame is encapsulated in the frame body field. The VTS control header of the VTS frame is not encapsulated in the frame body field of the MAC frame in one embodiment. Alternatively, the VTS control header is encapsulated in the frame body field in another embodiment. In one embodiment, when the VTS control header is encapsulated in the frame body field of the MAC frame, the communication logic 540 sets an ethertype field in the MAC frame, to a value of 89-0d, for example, to distinguish the encapsulated VTS frame from other frames encapsulated in the MAC frame. In another embodiment, when the VTS control header is encapsulated in the frame body field of the MAC frame, the communication logic 540 sets an encapsulated type field in the MAC frame to indicate encapsulation of the VTS frame in the frame body field of the MAC frame. Alternatively, when the VTS control header is encapsulated in the frame body field of the MAC frame, the communication logic 540 sets both the ethertype filed and the encapsulated type field in the MAC frame to indicate encapsulation of the VTS frame in the frame body field of the MAC frame.

Other than the wireless communication device 501, the system 500 may include a number of other wireless communication devices such wireless communication devices 502, 503 and 504 as depicted in FIG. 7. The total number of wireless communication devices in the system 500 may vary while four are shown in Figure to illustrate the concept. The wireless communication devices 501, 502, 503, and 504 communicate with each other via the transmission medium 505, for example, wirelessly according to the IEEE 802.11 standards. In one embodiment, one or more of the wireless communication devices 502, 503, and 504 are each structurally and/or functionally the same as the wireless communication devices 501. In another embodiment, one or more of the wireless communication devices 502, 503, and 504 are each structurally and/or functionally different from the wireless communication devices 501. In one embodiment, the wireless communication device 501 is an access point while the wireless communication devices 502, 503, and 504 are each a station in a basic service set.

Thus, embodiments of an inventive scheme to carry control information in data frames in WLAN communications have been disclosed. The implementation scheme according to the various embodiments disclosed herein should advantageously address the issues identified in the VTS PAR. There is no physical layer modification is necessary to implement the proposed scheme. With the proposed scheme, a station in the WLAN should be able to prioritize frames in an access category, and frame discarding without the need for deep inspection of the frame should be achievable.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of transmission of video frames generally described above. It will be understood by those skilled in the art that, although the embodiments described above and shown in the figures are generally directed to the context of transmission of video frames, applications related to transmission of high-priority frames other than video frames, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. In a wireless communication device configured to transmit a video frame in a wireless local area network, a method comprising:
   generating with a communication logic circuit a wirelessly transmissible data frame arranged for processing by an IEEE 802.11 media access control (MAC) frame processing device, the wirelessly transmissible data frame having embedded therein a video transport stream (VTS) frame of contiguous bits, the VTS frame having embedded therein a sequence of contiguous bits, the sequence of contiguous bits formed by bits of the video frame and bits of a VTS control header, the VTS control header having intra-access category priority and a frame discard priority control information with respect to the video frame, wherein the wirelessly transmissible data frame further includes a frame body field, and wherein the bits of the video frame are encapsulated in the frame body field and the bits of the VTS control header are not encapsulated in the frame body field; and
   transmitting with a wireless transmitter the wirelessly transmissible data frame.

2. The method of claim 1 wherein the control header further includes IEEE 802.1 audio video bridging (AVB) related control information.

3. The method of claim 1 wherein generating the wirelessly transmissible data frame comprises:
   generating the wirelessly transmissible data frame to include a frame control header and the VTS frame in the wirelessly transmissible data frame; and
   setting each of a type field and a subtype field in the frame control header of the wirelessly transmissible data frame to a respective value to indicate a presence of the VTS frame in the wirelessly transmissible data frame.

4. The method of claim 3 wherein setting the type field and the subtype field in the frame control header of the wirelessly transmissible data frame comprises setting a value of the type field to 11 and setting a value of the subtype field to one of 1000, 1001, 1010, 1011, 1100, 1110, and 1111.

5. The method of claim 1, further comprising:
   setting an ethertype field in the wirelessly transmissible data frame to distinguish the embedded VTS frame from other frames encapsulated in the frame body field of the wirelessly transmissible data frame.

6. The method of claim 5 wherein setting the ethertype field comprises setting a value of the ethertype field to 89-0d.

7. The method of claim 1, further comprising:
   setting an encapsulated type field in the wirelessly transmissible data frame to indicate encapsulation of the video frame in the frame body field of the wirelessly transmissible data frame.

8. A circuit in a wireless communication device, comprising:
   communication logic configured to generate a wirelessly transmissible data frame arranged for processing by an IEEE 802.11 media access control (MAC) device, the wirelessly transmissible data frame having embedded therein a video transport stream (VTS) frame of contiguous bits, the VTS frame having embedded therein a sequence of continuous bits, the sequence of continuous bits formed by bits of a video frame and bits of a VTS control header, the VTS control header having intra-access category priority and a frame discard priority control information with respect to the video frame, wherein the wirelessly transmissible data frame further includes a frame body field, and wherein the video frame is encapsulated in the frame body field and the VTS control header is not encapsulated in the frame body field.

9. The circuit of claim 8, wherein the VTS control header further includes IEEE 802.1 audio video bridging (AVB) related information.

10. The circuit of claim 8 wherein the communication logic is configured to generate the wirelessly transmissible data frame having a frame control header and the VTS frame, and wherein the communication logic is further configured to set a type field and a subtype field in the frame control header of the wirelessly transmissible data frame to indicate a presence of the VTS frame in the wirelessly transmissible data frame.

11. The circuit of claim 10 wherein the communication logic sets a value of the type field to 11 and sets a value of the subtype field to one of 1000, 1001, 1010, 1011, 1100, 1110, and 1111.

12. The circuit of claim 8 wherein the communication logic is configured to set an ethertype field in the wireless transmissible data frame to distinguish the embedded VTS frame from other frames encapsulated in the frame body field of the wirelessly transmissible data frame.

13. The circuit of claim 12 wherein the communication logic sets the ethertype field to 89-0d.

14. The circuit of claim 8 wherein the communication logic sets an encapsulated type field in the wirelessly transmissible data frame to indicate encapsulation of the video frame in the frame body field of the wirelessly transmissible data frame.

\* \* \* \* \*